United States Patent Office 3,484,339
Patented Dec. 16, 1969

3,484,339
BLENDS OF POLYESTERS CONTAINING FREE CARBOXYL GROUPS AND LAMINATE THEREOF
John R. Caldwell, Kingsport, Tenn., assignor to Eastman Kodak Company, Rochester, N.Y., a corporation of New Jersey
No Drawing. Filed May 2, 1966, Ser. No. 546,599
Int. Cl. B32b 27/36
U.S. Cl. 161—231                                            19 Claims

ABSTRACT OF THE DISCLOSURE

Compositions having improved adhesion to a variety of materials are prepared by blending a polyester having free carboxyl groups and a polymeric material (such as a polyester, cellulose ester, vinyl polymer, or wax).

---

This invention relates to novel compositions comprising blends of polyesters containing free carboxyl groups, and, more particularly, it relates to such blends having improved adhesion to a wide variety of materials.

The novel compositions of this invention are prepared by blending any of a wide variety of polymeric materials with a carboxylated polyester which is prepared by reacting certain low molecular weight hydroxyl-terminated polyesters or poly(ether glycols) with a tetracarboxylic acid dianhydride. The resulting composition has a highly improved adhesion with respect to other materials as compared to the adhesion of the polymeric material itself.

It is an object of this invention to provide novel compositions with an improved degree of adhesion.

It is another object of this invention to provide blends of carboxylated polyesters with any of a wide variety of polymeric materials.

It is still another object of this invention to provide blends which may be formed into films or coatings for use in adhering to any of a wide variety of materials.

It is another object of this invention to provide a method of preparing a laminate employing the blend composition of this invention.

Still other objects will appear from the more detailed description of this invention which follows.

Certain aspects of the foregoing objects are accomplished in accordance with this invention by providing a composition of enhanced adhesion comprising a blend of (a) 0.3% to 40% by weight of a carboxylated polyester consisting essentially of repeating units of the formula:

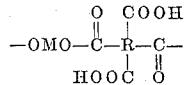

and having about 1.2 to about 15 weight percent free carboxyl groups; and (b) 60% to 99.7% by weight of a material selected from the group consisting of: cellulose esters, cellulose ethers, vinyl polymers, acrylic polymers, polyesters, polycarbonates, polyolefins, styrene polymers, polyamides, polyesteramides, polyureas, polyurethanes, poly(phenylene oxides), polysulfones, polyethers, polyacetals, and waxes. In the foregoing formula M is the residue of a hydroxyl-terminated polyester or a poly-(ether glycol) having a molecular weight of about 400 to about 8000, R is a tetravalent organic radical and $R^1$ is hydrogen or carboxyl.

In an especially preferred embodiment of my invention R is a tetravalent organic group free of olefinic unsaturation containing 4 to about 40 carbon atoms and corresponding to the residue of a tetracarboxylic acid dianhydride. Typical of the tetracarboxylic acid dianhydrides from which the tetravalent group R is derived are those which can be represented by the formulae:

(a) 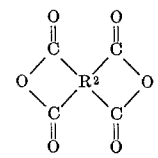

or (b) 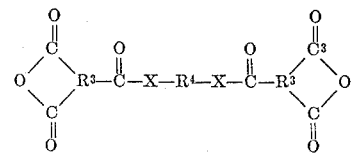

in which $R^2$ is a tetravalent aromatic radical of 6 to 15 carbon atoms, $R^3$ is a trivalent carbocyclic radical of 6 ring carbon atoms, $R^4$ is a divalent aliphatic radical of 2 to 8 carbon atoms and X is oxygen or imino. Tetracarboxylic acid dianhydrides of the Formula b are disclosed in U.S. Patents 3,182,073; 3,182,074; and 3,183,248.

Certain other aspects of the foregoing objects are accomplished in accordance with this invention by providing a laminate of at least three layers in which the interlayer is the above described composition and the other two layers are: metal, wood, paper, fabric, fibrous material, or synthetic polymeric material.

One of the two principal reactants employed in preparing the carboxylated polyester of this invention is a hydroxyl-terminated polymer having a molecular weight of 400 to 8000. This hydroxyl-terminated polymer can be represented by the formula HOMOH in which M is as hereinbefore defined and is either a hydroxyl-terminated polyester or a poly(ether glycol). The hydroxyl-terminated polyester may be prepared by the condensation of any of a wide variety of dicarboxylic acids with any of a wide variety of glycols, or alternatively, it may be prepared by the self-condensation of hydroxy acids. Copolyesters may also be employed in this invention and these materials are made by employing two or more dicarboxylic acids, two or more glycols, or two or more hydroxy acids in the condensations just mentioned.

The glycols, which may be employed to prepare the hydroxyl-terminated polyesters may have an aliphatic or aromatic structure. The preferred glycols are the saturated alkylene glycols having 2–20 carbon atoms per molecule and the saturated polyoxyalkylene glycols having 2–30 repeating oxyalkylene groups, each group of which having 2–4 carbon atoms. In certain embodiments of this invention, glycols having ethylenic unsaturation may be employed, e.g., when cross-linking sites are desired in the final product, but usually it is preferred to employ saturated glycols so as to eliminate the possibility of premature cross-linking. Among the aliphatic glycols which may be conveniently employed are: ethylene glycol; 1,2-propanediol; 1,3 - propanediol; 2,2-dimethyl-1,3-propanediol; 1,3 - butanediol; 1,4 - butanediol; 2,3-butanediol; 2-methyl - 1,4-butanediol; 1,5-pentanediol; 2,2,4-trimethyl-1,3-pentanediol; 1,5-hexanediol; 2-ethyl-1,3-hexanediol; 3-methyl-1,6-hexanediol; the higher polymethylene glycols having 2–20 carbon atoms per molecule; and any of the corresponding branched chain glycols, secondary glycols, and the like. Among the aliphatic glycols may be mentioned the cycloalkane glycols such as: 1,2-cyclohexanedimethanol; 1,2-dihydroxycyclohexane; 1,3-cyclohexanedimethanol; 1,3 - dihydroxycyclohexane; 1,4-cyclohexanedimethanol; 1,4-dihydroxycyclohexane; the various bicycloalkanediols such as norcamphanediols; the norcamphanedimethanols; and the like. Among the aromatic glycols may be mentioned the α,α'-dihydroxyxylenes, dibenzyl alcohol, and the like.

The dicarboxylic acids which may be employed to prepare the hydroxyl-terminated polyester may also be aliphatic or aromatic. Typical aliphatic dicarboxylic acids are: malonic acid, succinic acid, glutaric acid, adipic acid, pimelic acid, suberic acid, azelaic acid, sebacic acid, and any of the polymethylene dicarboxylic acids having 3–20 carbon atoms per molecule. Branched chain aliphatic dicarboxylic acids are also operable in this invention and, therefore, include compounds such as: dimethyl malonic acid, ethyl succinic acid, 2,2-dimethylsuccinic acid, 2-methyladipic acid, and the like. The aliphatic dicarboxylic acids which may be employed include cycloalkanedicarboxylic acids such as: 1,2-cyclohexanedicarboxylic acid; 1,3-cyclohexanedicarboxylic acid; 1,4-cyclohexanedicarboxylic acid; and similar cyclopentanedicarboxylic acids, etc. Aromatic acids which are suitable for the purposes of this invention include: phthalic acid, isophthalic acid, terephthalic acid, 5-chloroisophthalic acid; homophthalic acid; and the various naphthalenedicarboxylic acids. Another type of acid which may be employed for this purpose is one having one or more ether groups. Representative of such acids are diglycolic acid; 3,3'-oxydipropionic acid; and p-phenylenedioxydiacetic acid.

Another source of dicarboxylic acid for use in this invention is the dimer of a fatty acid, such as; the dimerized oleic acid and dimerized linoleic acid.

As mentioned above, the polyester may be prepared by the self-condensation of hydroxy acids. Typical of such compounds are: glycolic acid, lactic acid, hydroxypivalic acid, hydroxyacetic acid, 6-hydroxyhexanoic acid, 4-hydroxymethylcyclohexanecarboxylic acid, and the like.

The hydroxyl-terminated polyester is prepared by reacting one or more of the above acid materials with one or more of the above glycols in such a fashion that the product has hydroxyl groups on the terminal positions of the polymer chain. Well-known methods may be employed to assure the presence of hydroxyl groups at these terminal positions. One method is to employ a deliberate excess of glycol in the initial condensation reaction used to prepare the polyester. An alternate procedure is to heat a preformed polyester in the presence of a glycol to change any terminal acid groups to hydroxyl groups. The hydroxyl-terminated polyester should have a molecular weight in the range of 400 to 8000.

The poly(ether glycol) useful in preparing the carboxylated polyesters useful in my invention typically contain from 2 to 4 carbon atoms between the ether groups and contain sufficient repeating units to provide a poly(ether glycol) having a molecular weight of about 400 to about 8000. Typical of the poly(ether glycols) useful in preparing the carboxylated polyesters used in my invention are:

polyethylene glycol      $HO(C_2H_4O)_{n'}H$ polypropylene glycol      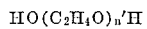

poly(1,3-propylene glycol)      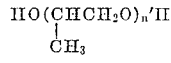

poly(1,2-butylene glycol)      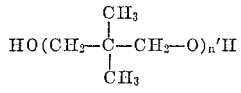

poly(1,4-butylene glycol)      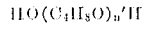

in which $n'$ is typically from 4 to 100 and is sufficiently large to provide a poly(ether glycol) having a molecular weight of about 400 to about 8000.

The hydroxyl-terminated polyester or poly(ether glycol), as described above, is then reacted with a tetracarboxylic acid anhydride to produce the product of this invention. The reaction is carried out at a temperature of about 100°–220° C. The reaction may be carried out in solution in which all reactants are dissolved in a suitable inert solvent or the reaction may be carried out by merely mixing the reactants at the proper temperature. Suitable solvents for a solution reaction include materials such as: toluene, xylene, chlorobenzene, cresol, diphenyl, diphenyl ether, chlorinated diphenyl, gamma-butyrolactone, and cyclohexanone. The reaction may require as little as a few minutes to as much as a few hours to reach completion depending upon the temperature and the nature of the reactants, although, in most instances, a reaction time of about 10 minutes to about two hours will be sufficient. The amount of tetracarboxylic acid dianhydride, which is employed, is preferably about 1 mol of dianhydride per mol of hydroxyl-terminated polyester or per mol of poly(ether glycol), although the proportions may range from about 0.8 to about 1.2 mols of dianhydride per mol of polyester or per mol of poly(ether glycol).

The products which are prepared can be made with any of a wide range of melting points depending upon the choice of materials in the reactants. If aliphatic dicarboxylic acids are employed in preparing the hydroxyl-terminated polyester, the carboxylated polyester product will probably be a soft, tacky gum at room temperature. On the other hand, if terephthalic acid is employed in the preparation of the hydroxyl-terminated polyester, the carboxylated polyester product may have a melting point of 200°–250° C. or more. If the carboxylated polyester product has a melting point above about 200° C., it is usually preferable to carry out the carboxylation reaction in an inert solvent so that the temperature may be kept below 200° C. thereby minimizing the reactions of free carboxyl groups.

The tetracarboxylic acid dianhydrides, which may be employed to prepare the products of this invention, include compounds such as: pyromellitic dianhydride; 3,4,3',4'-benzophenonetetracarboxylic acid dianhydride; butane-1,2,3,4-tetracarboxylic dianhydride; diphenyl-2,3,5,6-tetracarboxylic dianhydride; carboxymethanetriacetic dianhydride; 1,2,4,5 - cyclohexanetetracarboxylic dianhydride; cyclobutane-1,3-dicarboxylic - 2,4 - diacetic dianhydride; chloropyromellitic dianhydride; naphthalene-1,4,5,8-tetracarboxylic dianhydride; and diphenyl-3,4,3',4'-tetracarboxylic dianhydride.

The compositions of this invention are prepared by blending one of the above described carboxylated polyesters with another material to provide that material with an improved degree of adhesivity. The other material which forms a part of the blend is any of a wide variety of natural or synthetic polymeric materials. Among the specific materials which may be incorporated into the blends of this invention are the following illustrative types: cellulose esters, such as cellulose acetate, cellulose triacetate, cellulose propionate, cellulose acetate butyrate, cellulose caproate, and cellulose nitrate; cellulose ethers, such as ethyl cellulose, benzyl cellulose, and methyl cellulose; vinyl polymers, such as the homopolymers and copolymers of vinyl acetate, vinyl chloride, vinylidene chloride, vinyl fluoride, vinyl acetal, and vinyl alcohol; acrylic polymers, such as the polymers and copolymers of the alkyl, cycloalkyl, and phenyl esters of acrylic and methacrylic acids; the amides and N-substituted amides of acrylic and methacrylic acids; the ntriles of acrylic and methacrylic acids; polyesters, such as those made from the condensation of dicarboxylic acids and glycols, the self-condensation of hydroxy acids, the condensation of bisphenols and dicarboxylic acids, and the condensation of bisphenols and disulfonic acids; polycarbonates; polyolefins, such as polyethylene, polypropylene, polybutylene, poly(isobutylene), poly(2-methyl-4-pentene), poly(vinylcyclohexane), and poly(allylbenzene), and copolymers made from these olefins and other ethylenically unsaturated monomers; styrene polymers, such as the homopolymers and copolymers of styrene, alphamethyl styrene, and chlorostyrene; polyamides; polyesteramides; polyureas; polyurethanes; poly(phenylene oxides); polysulfones; polyethers; polyacetals; and waxes of various types. It is to be understood that the foregoing list is not exhaustive of those materials which may be blended with the carboxylated polyesters described above. Any material which is compatible with those carboxylated polyesters is intended to be included with the scope of this invention.

The blended compositions of this invention may be prepared by any of a variety of well-known methods such as the use of hot rolls, sigma-blade mixers, screw extruders, etc. If the blended composition is to be employed as a solution for preparing a coating or casting a film or the like, the carboxylated polyester and the polymeric material may be conveniently dissolved in a common solvent to prepare the blend. Even though the final composition is not to be used as a solution, the blend may be prepared in this fashion and then coprecipitated to give an intimate mixture of the two materials that is suitable for extrusion, hot pressing, or other fabricating operation. The composition may be employed as a melt adhesive, it may be cast or pressed into films, or employed in other fashions. Films which are prepared from the blended compositions of this invention may be utilized by placing the film between two surfaces to be joined in the form of a laminated assembly and hot pressing the entire assembly. On the other hand, the blended compositions may be fabricated into the form of granules or powder to be employed in that condition.

The blended composition should contain not less than about 0.3% of the carboxylated polyester when employed with materials which require little modification to enhance their adhesivity and not more than about 40% by weight in any event. The preferred range is from about 2% to about 15% by weight of the carboxylated polyester and the remainder being the polymeric material employed in the blend. The polymeric material may, of course, contain plasticizers, pigments, stabilizers, fillers, etc., but all of this is intended to be included with the term "polymeric material" as a component of the blend.

The blended compositions of this invention have an excellent adhesion to a wide variety of substrates. Among the materials which may be adhesively joined to the blended compositions of this invention are: metals, such as iron, steel, aluminum, copper, brass, bronze, zinc, chromium, nickel, lead, and various alloys; thermosetting resins, such as phenol-formaldehyde, urea-formaldehyde, melamine-formaldehyde, vulcanized natural and synthetic rubbers, and epoxy resins; fabrics and fibers, such as cotton, wool, viscose rayon, cellulose acetate and triacetate, nylon, polyesters, acrylics, modacrylics, and polyolefins; and other thermoplastic materials, such as cellulose esters, cellulose ethers, vinyl polymers, acrylic polymers, polyesters, polycarbonates, polyolefins, styrene polymers, polyamides, polyesteramides, polyureas, polyurethanes, poly(phenylene oxides), polysulfones, polyethers, polyacetals, and waxes.

The invention may be more fully understood by reference to the following illustrative examples which are intended to describe certain embodiments of this invention but are not intended to restrict the scope of the invention in any manner whatsoever. Parts and percentages are by weight and temperatures are in degrees centigrade unless otherwise specified. The adhesion of coatings was tested by the "Scotch tape" test which is run by pressing a pressure-sensitive tape against the coated surface and then rapidly stripping the tape away to see whether the coating separates from the substrate. In a severe form of the test the coating, before the tape is applied, is cut through to the substrate with a knife in a checker-board pattern.

EXAMPLE 1

A hydroxyl-terminated polyester having a molecular weight of about 1,400 and terminated with hydroxyl groups was made from 0.5 mol isophthalic acid, 0.5 mol sebacic acid, and 1,4-cyclohexanedimethanol. It was heated with a molar equivalent of pyromellitic dianhydride to form a linear polymer containing free carboxyl groups located at intervals along the molecular chain.

The carboxylated polyester was blended in chloroform solution with cellulose acetate butyrate, ethyl cellulose, and the polycarbonate of norbornylidenediphenol. The blends contain 10%, 20%, and 30% by weight of the polyester.

The solutions were applied on iron and aluminum plates. The coatings had excellent adhesion as determined by the "Scotch tape" test. Cellulose acetate butyrate, ethyl cellulose, and polycarbonate coatings that did not contain the polyester were removed by the tape test, showing that the adhesion was greatly improved by the polyester.

EXAMPLE 2

A hydroxyl-terminated polyester having a molecular weight of about 1,400 was made as described in Example 1 from 0.5 mol terephthalic acid, 0.5 mol isophthalic acid, and 1,4-butanediol. It was reacteed with an equivalent amount of pyromellitic dianhydride to form the carboxylated polyester.

The carboxylated polyester product was blended with cellulose acetate butyrate, ethyl cellulose, and the polycarbonate as described in Example 1 and coated onto iron and aluminum. The coatings had excellent adhesion.

EXAMPLE 3

A hydroxyl-terminated polyester made from 0.7 mol isophthalic acid, 0.3 mol terephthalic acid, and ethylene glycol was carboxylated and was employed as a coating as described in Examples 1 and 2 and found to produce coatings with adhesive characteristics similar to those described in Examples 1 and 2. The coatings showed no evidence of separation from the substrate even when the more severe form of the "Scotch tape" test was used.

EXAMPLE 4

The importance of free carboxyl groups on the polyester for improving adhesion is shown in this example. A hydroxyl-terminated polyester was made from 0.5 mol isophthalic acid, 0.5 mol sebacic acid, and 1,4-cyclohexanedimethanol, as described in Example 1. However, it was not treated with pyromellitic dianhydride and hence did not contain any free carboxyl groups.

The hydroxyl-terminated polyester was blended in chloroform solution with cellulose acetate butyrate, ethyl cellulose, and the polycarbonate of norbornylidenediphenol. The blends contained 20% of the polyester. Each of the blend solutions was coated on aluminum and on steel. In each instance the resultant coating was removed by the tape test. The results show that carboxyl groups are necessary in order to obtain a high degree of adhesion.

EXAMPLE 5

A hydroxyl-terminated polyester having a molecular weight of about 1,400 was made from 0.5 mol isophthalic acid, 0.5 mol adipic acid, and 1,4-cyclohexanedimethanol, and 140 g. of this polyester was heated with 21.8 g. of pyromellitic dianhydride at 160°–190° C. for 2 to 3 hours to form a linear polymer containing free carboxyl groups located at intervals along the molecule.

Blends were prepared by dissolving 1 part of the carboxylated polyester and 4 parts of one of the following film-forming polymers in chloroform:

(a) poly(methyl methacrylate),
(b) polystyrene,
(c) an elastomer made from Bisphenol A polycarbonate modified with 40% by weight polytetramethyleneoxide glycol,
(d) the polymer of 2,6-dimethylphenol,
(e) a polysulfone, and
(f) a polyester made from 0.5 mol isophthalic acid, 0.5 mol terephthalic acid, and Bisphenol A.

The blend solutions were employed to prepare coatings on steel and aluminum panels. The solvent was evaporated. The resultant coatings had excellent adhesion and withstood the "Scotch tape" test.

Five parts of the same carboxylated polyester was blended with 95 parts of a vinyl chloride-vinyl acetate copolymer in chloroform and coatings were prepared on steel, copper, and aluminum from the solution. The adhesion of the coating was excellent on all three metals.

As a comparison, each of the film-forming polymers mentioned in this example was used by itself to form coatings on the various substrates, and in each instance the coating had poor adhesion and was entirely removed by the tape test.

The carboxylated polyester of this invention also improves the adhesion of film-forming polymers to organic substrates such as nylon. One part of the carboxylated polyester of this example was blended with 4 parts of the following polymers in chloroform solution: norbornylidenediphenol polycarbonate, 2,2,4,4-tetramethylcyclobutane-1,3-diol polycarbonate, and cellulose acetate butyrate. The resulting dopes were coated on molded plates of 66 nylon. The adhesion of the coating was excellent in each instance. Coatings made from the same materials, not blended with the carboxylated polyester had poor adhesion to the nylon plates.

EXAMPLE 6

A hydroxyl-terminated polyester having a molecular weight of about 3,000 was made from 0.5 mol terephthalic acid, 0.5 mol isophthalic acid, and 2,2-dimethyl-1,3-propanediol. One molecular proportion of this hydroxyl-terminated polyester was heated with 1 molecular proportion of 1,2,3,4-butanetetracarboxylic acid dianhydride at 160°–180° C. for 3 hours. The product was a clear, brittle glass, soluble in chloroform, methylene chloride, methyl ethyl ketone, butyl acetate, and 90 toluene–10 ethanol.

Using appropriate solvents from the above group, several blends were made comprising 10% of the carboxylated polyester and 90% of one of the following film-forming materials:

(a) cellulose acetate, acetone soluble type,
(b) cellulose triacetate,
(c) cellulose acetate butyrate,
(d) benzyl cellulose,
(e) 85 vinyl chloride–15 vinyl acetate copolymer,
(f) 80 vinylidene chloride–20 ethyl acrylate copolymer,
(g) poly(methyl methacrylate),
(h) polystyrene,
(i) a polyester made from 0.6 mol isophthalic acid, 0.4 mol terephthalic acid, and 1.0 mol 1,4-cyclohexanedimethanol,
(j) norbornylidene diphenol polycarbonate,
(k) a polyamide made from 0.7 mol caprolactam, 0.3 mol hexamethylene diamine, and 0.3 mol adipic acid, and
(l) poly(vinyl butyral).

The blend solutions were coated on the following substrates: iron, aluminum, copper, brass, zinc, a phenol-formaldehyde resin, a melamine-formaldehyde resin, wood, paper, polyformaldehyde, nylon, cellulose acetate, Bisphenol A polycarbonate, cellulose nitrate, vulcanized rubber, leather, and flame-treated polyethylene. In each instance the adhesion was good to excellent.

EXAMPLE 7

A hydroxyl-terminated polyester was made from 2 mols of dimer acid and 3 mols of 1,4-cyclohexanedimethanol, and the product was reacted with 1 mol of pyromellitic dianhydride to produce a carboxylated polyester in the form of a viscous oil.

Polyethylene and polypropylene were blended on the hot rolls with 1% of the polyester by weight. Films made from the blends had improved wettability for aqueous solutions and water-based inks. These improved surface properties were present even in blends in which the concentration of the polyester was as low as 0.2% to 0.3%.

This carboxylated polyester was useful in enhancing the surface properties of other poly(alpha-olefins) such as ethylenebutylene copolymers, poly(4-methyl-pentene-1), polyallomers, and waxes.

EXAMPLE 8

A hydroxyl-terminated polyester having a molecular weight of 1,800 was made from 1.0 mol of 1,4-cyclohexanedicarboxylic acid, 1 mol of caprolactone, and p-xylylene glycol, and 1 molecular proportion of it was reacted with 1.2 molecular proportions of 1,2,4,5-cyclohexanetetracarboxylic acid dianhydride to make the corresponding carboxylated polyester.

One part of the carboxylated polyester, 6 parts of cellulose acetate butyrate, and 1 part of dibutyl phthalate (as a plasticizer) were dissolved in 20 parts of methylene chloride and a film was cast from the solution on glass. The film was removed and placed in contact with a steel plate. The assembly was pressed at 200°–220° C. in a hot press. The adhesion of the acetate butyrate coating was very good. Similar results were obtained with aluminum, zinc, and brass.

The blend of polyester, cellulose ester, and plasticizer was extruded continuously in contact with an aluminum strip using a standard hot extrusion press. The adhesion of the blend to the aluminum was good.

EXAMPLE 9

Polypropylene glycol having a molecular weight of 400 was heated with 1 molecular equivalent amount of the compound:

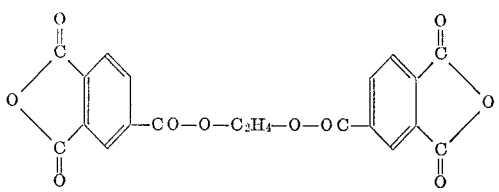

The reaction was carried out at 150°–160° C. for 3 hours.

A similar product was made using the compound:

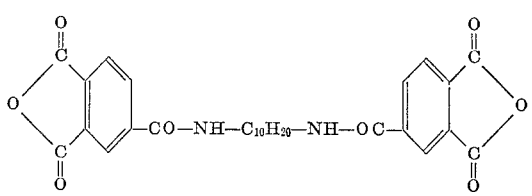

The dianhydride derivatives were made by the methods described in U.S. Patents 3,182,073, 3,182,074, and 3,183,248.

The resulting carboxylated polyesters were blended in solution with the following polymeric materials in the proportion of 15 parts by weight polyester to 85 parts by weight polymeric material:

(a) cellulose propionate,
(b) cellulose acetate butyrate,
(c) poly(vinyl formal),
(d) a polyurethane made from 2,4-tolylenediisocyanate and hexamethylene glycol,
(e) a copolymer made from 85 vinyl chloride–15 diethyl fumarate,
(f) a copolymer made from 60 ethyl methacrylate–40 isobutyl acrylate,
(g) a copolymer made from 55 acrylonitrile–45 ethyl acrylate, and
(h) Bisphenol A polycarbonate.

The blend solutions were used to make coatings on aluminum, iron, zinc, brass, paper, wood, polysulfone, and poly(2,6-dimethylphenol). In each instance the coating had good adhesion to the substrate.

EXAMPLE 10

A hydroxyl-terminated polyester was made from 6 mols of 1,4-cyclohexanedimethanol, 2 mols of maleic anhydride and 3 mols of phthalic anhydride, and it was reacted with 1 mol of pyromellitic dianhydride to make the corresponding carboxylated polyester.

Five parts of the carboxylated polyester and 95 parts of Bisphenol A polycarbonate were dissolved in 300 parts of chloroform and the resulting solution was coated on aluminum and steel. The coatings had excellent adhesion. Coatings made under the same conditions but without the carboxylated polyester had very poor adhesion.

A trace of cobalt and manganese naphthenates was added to the above blend solution. The coatings were heated at 130°–140° C. for 30 minutes to cure the maleic polyester. The adhesion was very good and the solvent resistance was improved.

The carboxylated polyester of this example was mixed with cellulose acetate butyrate, polystyrene, poly(methyl methacrylate), and a polyester made from isophthalic acid and 2,2,4,4-tetramethyl-1,3-cyclobutanediol. Various compositions were prepared containing from 2% to 20% of the carboxylated polyester. Coatings of these compositions on aluminum, iron, brass, copper, zinc, paper, and wood had excellent adhesion to the substrate.

A blend of 60 parts cellulose acetate butyrate and 40 parts of the carboxylated polyester is an excellent priming coat on metals, and can be used with a wide variety of top coats.

EXAMPLE 11

A hydroxyl-terminated polyester having a molecular weight of about 7,000 was made from 0.8 mol of 2,6-naphthalenedicarboxylic acid, 0.2 mol sebacic acid, and diethylene glycol; and it was reacted with 1 molecular equivalent of 3,4,3',4'-benzophenonetetracarboxylic acid dianhydride to prepare the corresponding carboxylated polyester. A blend of 30 parts of the polyester and 70 parts of cellulose acetate butyrate had excellent adhesion on metals.

EXAMPLE 12

A hydroxyl-terminated polyester having a molecular weight of 2,300 was made from isophthalic acid, 0.5 mol of 1,4-cyclohexanedimethanol, and 0.5 mol of 2,2,4,4-tetramethyl - 1,3 - cyclobutanediol. This polyester was reacted with a molecular equivalent of tetracarboxycyclopentane dianhydride to prepare the corresponding carboxylated polyester.

One part of the carboxylated polyester, 6 parts of cellulose acetate butyrate, and 1 part of bisphenol A bisglycidyl ether were mixed in a solvent composed of 8 parts toluene and 2 parts ethyl alcohol. The resulting mixture was coated on aluminum, iron, and copper sheets. After the solvent had evaporated, the sheets were heated at 150°–160° C. for 5 minutes. In each instance the coating had excellent adhesion and was insoluble in all solvents. Similar results were obtained when poly(vinyl acetate) was used in place of the cellulose ester. Similar results were also obtained when a butylated melamine-formaldehyde resin was used as a curing agent.

One part of the carboxylated polyester of this example, 2 parts of vinyl chloride-vinyl acetate copolymer, 1 part of dioctyl sebacate, and 1 part of a phenol-formaldehyde resin were blended in cyclohexanone. Coatings of the blend were made on metal, wood, and paper and were cured at 110°–130° C. for 20 minutes. The coatings had excellent adhesion to the substrates. This carboxylated polyester is readily blended with standard polyvinyl chloride plastisol formulations.

EXAMPLE 13

The various blends described in the above examples are useful as adhesives for bonding metals, plastics, wood, paper, textiles, etc. For instance, the blends in the form of thin films may be placed between 2 surfaces and the structure is hot pressed to form an adhesive bond.

Although the invention has been described in considerable detail with reference to certain preferred embodiments thereof, it will be understood that variations and modifications can be effected within the spirit and scope of the invention as described hereinabove and as defined in the appended claims.

I claim:

1. A composition of enhanced adhesion comprising a blend of (a) 0.3 to 40 weight percent of a segmented carboxylated polyester consisting essentially of repeating units of the formula:

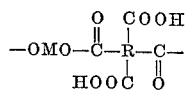

containing about 1.2 to about 15 weight percent free carboxyl groups in which R is a tetravalent organic group free of olefinic unsaturation containing 4 to about 40 carbon atoms and in which M is a divalent organic radical corresponding to the residue of a hydroxyl-terminated polymer having a molecular weight of about 400 to about 8000 and selected from:

(1) a hydroxyl-terminated polyester or
(2) a poly(ether glycol)

and (b) 60 to 99.7 weight percent of a material selected from cellulose esters, cellulose ethers, vinyl polymers, polyesters, other than said segmented carboxylated polyester, polyamides, polyesteramides, polyurethanes, and polyethers other than said segmented carboxylated polyester.

2. A composition according to claim 1 in which the hydroxyl-terminated polymer to which the residue M corresponds is a hydroxyl-terminated polyester.

3. A composition according to claim 2 in which the glycol component of said hydroxyl-terminated polyester corresponds to at least one aliphatic glycol having 2 to about 20 carbon atoms and free of olefinic unsaturation.

4. A composition according to claim 3 in which the aliphatic glycol of 2 to about 20 carbon atoms is selected from:

(a) tetramethylene glycol
(b) 2,2,4,4-tetramethyl-1,3-cyclobutanediol
(c) 1,4-cyclohexanedimethanol
(d) 2,2-dimethyl-1,3-propanediol
(e) 1,2-propylene glycol or
(f) ethylene glycol.

5. A composition according to claim 2 in which the dicarboxylic acid component of said hydroxyl-terminated polyester corresponds to at least one aliphatic dicarboxylic acid of 3 to 20 carbon atoms.

6. A composition according to claim 5 in which the dicarboxylic acid of 3 to 20 carbon atoms is selected from:
(a) adipic acid
(b) 1,4-cyclohexanedicarboxylic acid
(c) 1,3-cyclohexanedicarboxylic acid or
(d) maleic acid.

7. A composition according to claim 2 in which the dicarboxylic acid component of said hydroxyl-terminated polyester corresponds to at least one aromatic dicarboxylic acid of 8 to 14 carbon atoms.

8. A composition according to claim 7 in which the aromatic dicarboxylic acid is selected from:
(a) terephthalic acid
(b) isophthalic acid or
(c) phthalic acid.

9. A composition according to claim 1 in which the hydroxyl-terminated polymer to which the residue M corresponds is a hydroxyl-terminated poly(ether glycol) in which the ether linkages are separated by from 2 to about 4 carbon atoms.

10. A composition according to claim 9 in which the hydroxyl-terminated poly(ether glycol) is selected from:
(a) polyethylene glycol
(b) polypropylene glycol or
(c) polytetramethylene glycol.

11. A composition according to claim 1 in which the tetracarboxylic acid dianhydride to which the residue R corresponds has the formula:

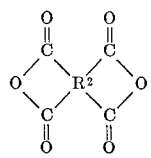

or the formula:

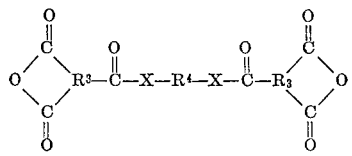

in which $R^2$ is a tetravalent organic radical of 4 to 15 carbon atoms; $R^3$ is a trivalent carbocyclic radical of 6 carbon atoms; $R^4$ is a divalent aliphatic radical of 2 to 8 carbon atoms and X is oxygen or imino.

12. A composition according to claim 11 in which the tetracarboxylic acid dianhydride is selected from:
(a) pyromellitic acid dianhydride
(b) 1,2,4,5-tetracarboxycyclohexane dianhydride
(c) 1,2,3,4-tetracarboxybutane dianhydride
(d) tetracarboxycyclopentane dianhydride
(e) naphthalene-1,4,5,8-tetracarboxylic acid dianhydride
(f) 3,4,3',4'-benzophenonetetracarboxylic acid dianhydride
(g) the tetracarboxylic acid dianhydride of the formula:

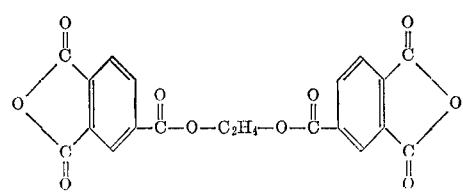

or
(h) the tetracarboxylic acid dianhydride of the formula:

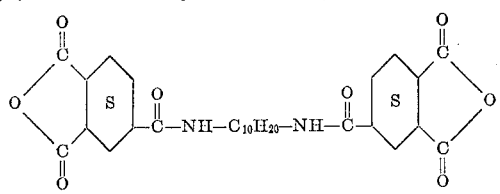

13. A composition according to claim 1 in which the tetracarboxylic acid dianhydride to which the tetravalent organic group R corresponds is selected from:
(a) pyromellitic acid dianhydride
(b) 1,2,4,5-tetracarboxycyclohexane dianhydride
(c) 1,2,3,4-tetracarboxybutane dianhydride
(d) tetracarboxycyclopentane dianhydride
(e) naphthalene-1,4,5,8-tetracarboxylic acid dianhydride
(f) 3,4,3',4'-benzophenonetetracarboxylic acid dianhydride
(g) the tetracarboxylic acid dianhydride of the formula:

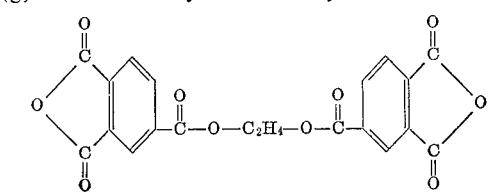

or
(h) the tetracarboxylic acid dianhydride of the formula:

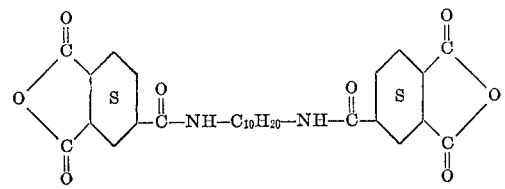

the hydroxyl-terminated polymer to which the divalent organic radical M corresponds, when a poly(ether glycol) is selected from:
(a) polyethylene glycol
(b) polypropylene glycol, or
(c) polytetramethylene glycol and, when a hydroxyl-terminated polyester, contains a dicarboxylic acid component selected from:
(a) adipic acid
(b) 1,4-cyclohexanedicarboxylic acid
(c) 1,3-cyclohexanedicarboxylic acid
(d) maleic acid
(e) terephthalic acid
(f) isophthalic acid or
(g) phthalic acid and a glycol component selected from:
(a) tetramethylene glycol
(b) 2,2,4,4-tetramethyl-1,3-cyclobutanediol
(c) 1,4-cyclohexanedimethanol
(d) 2,2-dimethyl-1,3-propanediol
(e) 1,2-propylene glycol or
(f) ethylene glycol.

14. A laminate comprising at least two layers, one of which is the composition of claim 1.

15. A composition according to claim 1 wherein the (b) material selected is a polyether.

16. A composition according to claim 15 wherein the polyether is poly(phenylene oxide).

17. A composition according to claim 15 wherein the polyether is polyvinyl acetal.

18. A composition according to claim 1 wherein the (b) material selected is a vinyl polymer.

19. A composition according to claim 18 wherein the vinyl polymer is acrylic polymer.

References Cited

UNITED STATES PATENTS

| | | | |
|---|---|---|---|
| 2,041,248 | 5/1936 | Hovey | 260—8 |
| 2,223,575 | 12/1940 | Pitman | 134—79 |
| 2,721,850 | 10/1955 | Hawtin et al. | 260—16 |
| 3,048,565 | 8/1962 | Gall et al. | 260—75 |
| 3,242,002 | 3/1966 | Brader et al. | 117—76 |
| 3,288,759 | 11/1966 | Holub et al. | 260—75 |
| 3,232,813 | 2/1966 | Newton | 156—320 |

FOREIGN PATENTS

| | | |
|---|---|---|
| 856,917 | 12/1960 | Great Britain. |

OTHER REFERENCES

Amoco Chemicals Corp. Technical Bulletin, "Trimellitic Anhydride," p. 30 (1958).

Del Monte: "Technology of Adhesives," p. 8, Reinhold, 1947.

WILLIAM H. SHORT, Primary Examiner

E. NIELSEN, Assistant Examiner

U.S. Cl. X.R.

117—161; 156—332; 161—214, 232; 260—16, 75, 835, 857, 858, 860, 873

PO-1050
(5/69)

UNITED STATES PATENT OFFICE
CERTIFICATE OF CORRECTION

Patent No. 3,484,339     Dated December 29, 1969

Inventor(s) John R. Caldwell

It is certified that error appears in the above-identified patent and that said Letters Patent are hereby corrected as shown below:

Column 2, line 15, "$C^3$" should read ---C---. Column 6, line 30, "reacteed" should read ---reacted---.

SIGNED AND
SEALED
JUN 2 1970

(SEAL)
Attest:

Edward M. Fletcher, Jr.
Attesting Officer

WILLIAM E. SCHUYLER, JR.
Commissioner of Patents